(No Model.)

A. GLENN.
CALF WEANER.

No. 508,216. Patented Nov. 7, 1893.

Witnesses

Inventor
Allen Glenn.
By Attorneys

UNITED STATES PATENT OFFICE.

ALLEN GLENN, OF SCRANTON, IOWA.

CALF-WEANER.

SPECIFICATION forming part of Letters Patent No. 508,216, dated November 7, 1893.

Application filed July 26, 1892. Serial No. 441,299. (No model.)

*To all whom it may concern:*

Be it known that I, ALLEN GLENN, a citizen of the United States, residing at Scranton city, in the county of Greene, State of Iowa, have invented certain new and useful Improvements in Calf-Weaners; and I do hereby declare the following to be a full, clear, and exact description of the invention, such as will enable others skilled in the art to which it appertains to make and use the same.

My invention relates to that class of devices commonly known as calf weaners.

The purpose of the invention is to provide a simple and light structure that will be durable and efficient for the purpose designed.

The improvement consists essentially of a frame comprising two complete rings which touch or are joined together at one side and which have the other portions separated and connected by suitable net or basket work. The planes of these two rings stand relatively at an angle of forty-five degrees to each other. The relative degree of inclination, however, is not essential. One of the rings, that by which the device is suspended from the head strap, is provided with loops which are preferably formed by coils in the wire composing said ring.

The improvement further consists of the novel features and the peculiar construction and combination of parts which will be hereinafter more fully described and claimed and which are shown in the annexed drawings, in which—

Figure 1:
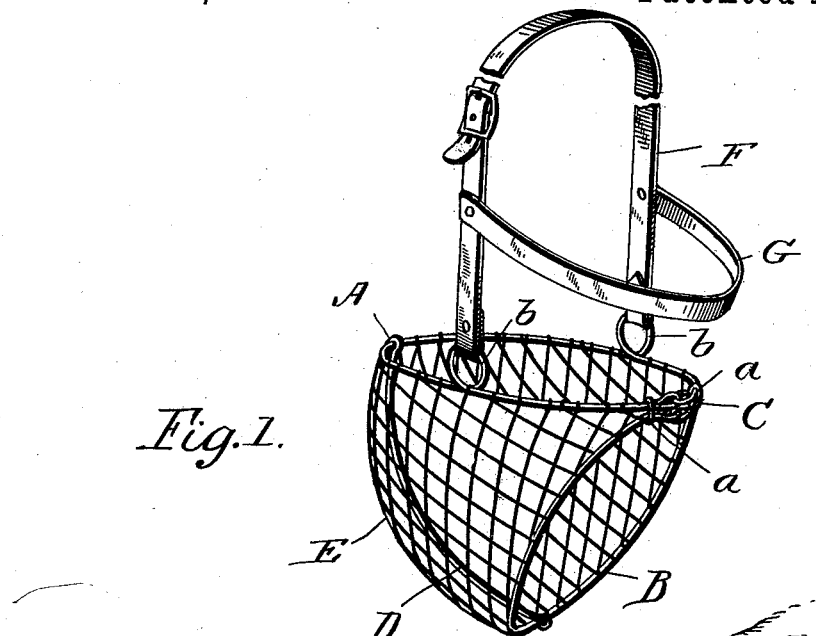
Figure 2:
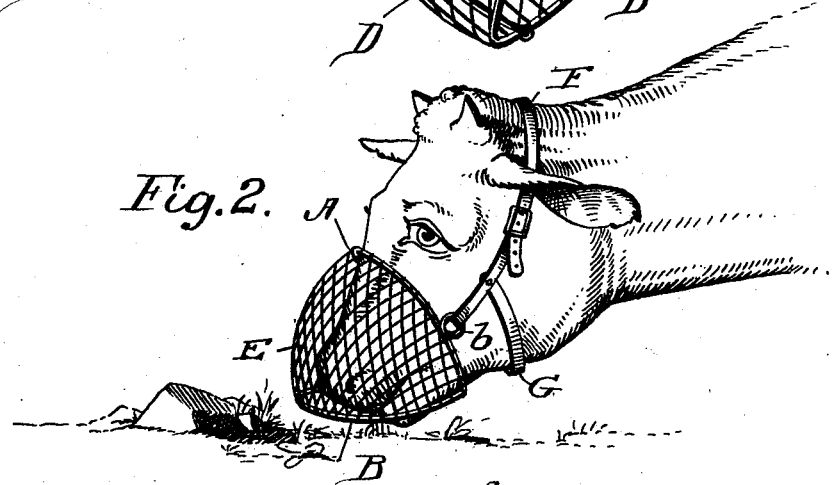
Figure 3:
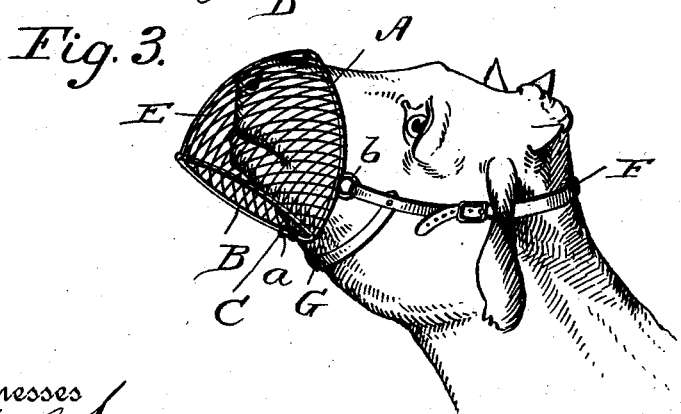

Figure 1 is a perspective view of a weaner constructed in accordance with and embodying my invention. Fig. 2 shows the application of the invention and its relative position when the animal is feeding. Fig. 3 is a view similar to Fig. 2 showing the relative position of the weaner when the animal attempts to suckle.

The device comprises essentially the two rings A and B which may be designated as the head and feeding rings respectively. These rings are elliptical in form and are connected or joined at one end, as shown at C in any desired manner, preferably by the links $a$ which are clinched about the contiguous portions of said rings. The rings diverge from the point C and stand apart at an angle of about forty-five degrees and are connected together at their outer ends in any convenient manner as by the brace wire D. The basket or net work E extends from one ring to the other to form a guard across the space comprised between the said rings A and B.

The rings A and B may be suitably constructed and are preferably formed of stout wire, the ends being looped together. By having the links $a$ located one on each side of the looped ends of the wires forming the rings A and B, the latter will be held in the required position against accidental displacement, as is manifest from the illustration. The ring B is provided with loops $b$ at diametrically opposite points, the same being formed preferably by coils in the wire composing said ring. The head strap F is connected at its ends with the loops $b$ and is of ordinary construction to be lengthened or shortened and buckled about the animal's head. The throat strap G is provided to prevent the animal throwing the device off after being placed in position.

It will be observed that the loops $b$ are located about midway of the ring B so that when the animal is grazing or feeding the device will occupy the position shown in Fig. 2 and should the animal elevate its head and attempt to suckle the device will fall across its mouth as shown in Fig. 3.

Heretofore devices of this class have been constructed of two bows which are placed about at right angles to each other and connected at their ends, and have the separated portions meshed together. To retain such devices in place on the muzzle of the animal extra rings or bands are provided to extend beneath the chin of the animal and receive the head straps. Moreover, the sides not being connected are liable to spread and the device soon gets out of shape unless the bows are made of extra heavy wire. In the present device these difficulties are obviated and no extra bands are required to hold the device in proper position on the muzzle. The feeding and head rings encircle the muzzle of the animal and retain the device in place and at the same time brace the device laterally and prevent spreading of the sides, thereby enabling the wires composing the said rings to be made comparatively light. Again, the weaners comprising the two bows present corners which chafe the cheeks and otherwise cause annoyance and discomfort to the animal, besides providing a construction which in the event of a sudden lateral wrench of the device, is apt to seriously injure the animal by causing one of the said corners to puncture the cheek or muzzle.

Having thus described my invention, what I claim, and desire to secure by Letters Patent, is—

1. The herein described calf weaner composed of the head ring A, and the feeding ring B to encircle the muzzle of the animal and retain the device in place and prevent spreading thereof, the two rings having the rear portions brought close together to come beneath the chin of the animal, and having their forward portions separated and meshed together, substantially as described.

2. The herein described calf weaner composed of the head ring A having side loops integrally formed therewith to receive the head strap, and the feeding ring B, to encircle the muzzle of the animal and retain the device in place and prevent spreading thereof, the two rings having the rear portions brought in contact to come below the chin of the animal and having their forward portions separated and meshed together, substantially as described.

3. The herein shown and described weaner composed of the head ring A having side loops integrally formed therewith to receive the head strap, and the feeding ring B, to encircle the muzzle of the animal and retain the device in place and prevent spreading thereof, the two rings being formed of wire which have their ends looped together and brought in contact below the chin of the animal, and having their forward portions separated and meshed together, and links embracing the rings at the point of contact, one on each side of the looped ends thereof, substantially as set forth.

In testimony whereof I affix my signature in presence of two witnesses.

ALLEN GLENN.

Witnesses:
G. F. COLBY,
ROBERT EASON.